(12) United States Patent
Takamoto et al.

(10) Patent No.: US 8,042,987 B2
(45) Date of Patent: Oct. 25, 2011

(54) KNEADING EXTRUDER

(75) Inventors: Seiji Takamoto, Hiroshima (JP); Shigeki Inoue, Hiroshima (JP); Masamichi Ishibashi, Hiroshima (JP)

(73) Assignee: The Japan Steel Works, Ltd., Tokyo (JP)

( * ) Notice: Subject to any disclaimer, the term of this patent is extended or adjusted under 35 U.S.C. 154(b) by 0 days.

(21) Appl. No.: 11/716,698

(22) Filed: Mar. 12, 2007

(65) Prior Publication Data

US 2007/0211560 A1 Sep. 13, 2007

(30) Foreign Application Priority Data

Mar. 10, 2006 (JP) ................................ 2006-066025

(51) Int. Cl.
 *B29B 7/48* (2006.01)
(52) U.S. Cl. .......................................... 366/82; 366/85
(58) Field of Classification Search .................... 366/75, 366/81, 88, 90, 297–301, 82–85, 96–99, 366/79, 318–324; 425/203, 204, 208, 209
 See application file for complete search history.

(56) References Cited

U.S. PATENT DOCUMENTS

| | | | | | |
|---|---|---|---|---|---|
| 215,372 | A | * | 5/1879 | Kuehne | 165/109.1 |
| 2,485,854 | A | * | 10/1949 | Zona | 366/88 |
| 3,195,868 | A | * | 7/1965 | Loomans et al. | 366/85 |
| 3,216,706 | A | * | 11/1965 | Loomans | 366/85 |
| 3,446,485 | A | * | 5/1969 | Fischer | 366/103 |
| 3,497,912 | A | * | 3/1970 | Fischer | 425/204 |
| 3,618,902 | A | * | 11/1971 | Brennan, Jr. | 366/301 |
| 4,343,929 | A | * | 8/1982 | Sugio et al. | 528/241 |
| 4,409,137 | A | * | 10/1983 | Mergan et al. | 588/3 |
| 5,048,971 | A | * | 9/1991 | Wall et al. | 366/85 |
| 5,302,106 | A | * | 4/1994 | Nogossek | 425/204 |
| 5,419,919 | A | * | 5/1995 | Song et al. | 426/5 |
| 5,487,602 | A | * | 1/1996 | Valsamis et al. | 366/81 |
| 5,728,337 | A | | 3/1998 | Yoshikawa et al. | |
| 5,847,052 | A | * | 12/1998 | Hamanaka et al. | 525/197 |
| 5,851,065 | A | * | 12/1998 | Ikeda et al. | 366/76.6 |
| 6,116,770 | A | * | 9/2000 | Kiani et al. | 366/82 |

(Continued)

FOREIGN PATENT DOCUMENTS

EP 1312452 A1 5/2003

(Continued)

OTHER PUBLICATIONS

Database WPI Week 200018, Derwent Publications Ltd., London, GB; AN 2000-200247 XP002439197.

(Continued)

*Primary Examiner* — Charles E Cooley
(74) *Attorney, Agent, or Firm* — Sughrue Mion, PLLC

(57) ABSTRACT

Twist kneading disks are arranged such that the width of a piece of disk is 0.1 to 0.5 times the cylinder inner diameter D, a helix angle θ as an angle between a vertex of the front surface side of the disk and vertex of the rear surface side of the disk at the tip portion is in a range of 0°<θ<90° in the reverse rotating direction of the screws as viewed from a cross section of the disk in the end direction of the screw shaft, and a phase angle E as an angle in correlation between the disks around the screw shaft is in a range of 0°<E<90°. The twist kneading disks are incorporated in the plasticization kneading portion at the length of more than 1.88 times the cylinder inner diameter D.

17 Claims, 13 Drawing Sheets

U.S. PATENT DOCUMENTS

| | | | |
|---|---|---|---|
| 6,170,975 B1 * | 1/2001 | Andersen | 366/82 |
| 6,179,460 B1 * | 1/2001 | Burkhardt et al. | 366/82 |
| 6,220,745 B1 * | 4/2001 | Kobayashi et al. | 366/83 |
| 6,447,156 B2 * | 9/2002 | Maris | 366/82 |
| 6,682,213 B2 * | 1/2004 | Inoue et al. | 366/76.4 |
| 7,004,616 B2 * | 2/2006 | Murakami et al. | 366/75 |
| 7,188,992 B2 * | 3/2007 | Mattingly, Jr. | 366/82 |
| 7,419,295 B2 * | 9/2008 | Inoue et al. | 366/75 |
| 7,618,180 B2 * | 11/2009 | Kakizaki et al. | 366/82 |
| 2001/0019729 A1 * | 9/2001 | Inoue | 425/204 |
| 2001/0031289 A1 * | 10/2001 | Maris | 425/204 |
| 2002/0093118 A1 * | 7/2002 | Inoue et al. | 264/211.23 |
| 2004/0090859 A1 * | 5/2004 | Chszaniecki | 366/85 |
| 2005/0013192 A1 | 1/2005 | Kakizaki et al. | |
| 2005/0041521 A1 | 2/2005 | Herter | |
| 2007/0177451 A1 * | 8/2007 | Benjamin et al. | 366/82 |
| 2007/0211560 A1 * | 9/2007 | Takamoto et al. | 366/82 |
| 2009/0213683 A1 * | 8/2009 | Fukutani et al. | 366/82 |
| 2011/0075511 A1 * | 3/2011 | Bierdel et al. | 366/301 |
| 2011/0141843 A1 * | 6/2011 | Bierdel et al. | 366/301 |
| 2011/0158039 A1 * | 6/2011 | Bierdel et al. | 366/301 |

FOREIGN PATENT DOCUMENTS

| | | | |
|---|---|---|---|
| EP | 2168743 A1 * | 3/2010 | |
| JP | 10193343 A | 7/1998 | |
| JP | 11010709 A * | 1/1999 | |
| JP | 200037764 A | 2/2000 | |
| JP | 2005-35212 A | 2/2005 | |
| JP | 2005067200 A * | 3/2005 | |

OTHER PUBLICATIONS

Database WPI Week 199840 Derwent Publications Ltd., London, GB; AN 1998-461335 XP002439198.

* cited by examiner

NO. 1

NO. 2

NO. 3

NO. 7

NO. 8

KNEADING EXTRUDER

This application claims priority from Japanese Patent Application No. 2006-066025, filed on Mar. 10, 2006, the entire subject matter of which is incorporated herein by reference.

BACKGROUND OF THE INVENTION

1. Field of the Invention

The present invention relates to a kneading extruder, which is suitably applicable to a plasticization kneading extruder for plastic material.

2. Description of the Related Art

One example of a plasticization kneading extruder for plastic material of related art is shown in FIG. 14. Twin screws 2 are provided in a cylinder 1 capable of heating and cooling. The screws 2 are coupled with a decelerator 4 and driven in the same rotating direction by a motor 3 coupled to the decelerator 4. The twin screws 2 are engaged with each other. The cylinder 1 has a feed port 5, a first vent 6a and a discharge port 7, which are placed in the order from the upstream of the cylinder 1. The screws 2 are configured by a solid transporting portion 8, a plasticization kneading portion 9 (a first kneading portion) and a molten material transporting portion 10 in the order from the upstream.

FIGS. 15A and 15B show another example of a plasticization kneading extruder for plastic material of related art.

In this case, twin screws 2 are provided in a cylinder 1 capable of heating and cooling. The screws 2 are coupled with a decelerator 4 and driven in the same rotating direction by a motor 3 coupled to the decelerator 4. The twin screws 2 are engaged with each other. The cylinder 1 has a feed port 5, first vent 6a, a side feeder 11, a second vent 6b and a discharge port 7, which are placed in the order from the upstream of the cylinder. The screws 2 are configured by a solid transporting portion 8, a plasticization kneading portion 9 (a first kneading portion), a first molten material transporting portion 10a, a molten kneading dispersion portion 12 (a second kneading portion) and a second molten material transporting portion 10b. A side feeder 13 is placed in the side feeder 11. The side feeder 13 is configured by a side feeder cylinder 14, a side feeder screw 15, a side feeder motor 16 and a side feeder decelerator 17. Two of the side feeder screws 15 are provided in the side feeder cylinder 14 to be able to generate the cooling. The side feeder screws 15 are coupled with the side feeder decelerator 17 and driven in the same rotating direction by the side feeder motor 16 coupled to the side feeder decelerator 17. The twin side feeder screws 15 are engaged with each other. The side feeder cylinder 14 has a side feeder port 18 from which solid sub-material (plastic, organic filler, inorganic filler, glass fiber, etc.) are supplied.

FIGS. 16A to 16C show typical disk type kneading wing disks configuring the plasticization kneading portion (the first kneading portion) 9 in FIG. 14, and the molten kneading dispersion portion (the second kneading portion) 12 in FIGS. 15A and 15B.

FIG. 16A shows a feeding wing (forward kneading: FK) functioning as forward kneading disks. FIG. 16B shows a return wing (backward kneading: BK) functioning as backward kneading disks. FIG. 16C shows a neutral wing (cross kneading: CK) functioning as cross kneading disks. With reference to each of the drawings, the left side is a side view of the wing, and the right side is a cross section view of the wing indicated by the arrows A-A on the left side view.

The FK is a kneading wing configured by five pieces of disks B, each of which is arranged at a phase angle E so that they are shifted in a position from one another in a flow direction of a plastic material H. The width of disk B is 0.1 to 0.9 times the diameter with respect to a cylinder inner wall F. Portions formed by flight vertexes of the disks B with respect to the cylinder inner wall F are tip portions G.

The BK is a kneading wing configured by five pieces of disks B, each of which is arranged at a phase angle E so that they are shifted in a position from one another in the backward direction opposite to the flow direction of the plastic material H. The width of disk B is 0.1 to 0.9 times the diameter with respect to a cylinder inner wall F. Portions formed by the flight vertexes of the disks B with respect to the cylinder inner wall F are tip portions G.

The CK is a kneading wing configured by five pieces of disks B, each of which is arranged at a phase angle E so that they are shifted at 90 degrees in a position from one another. The width of disk B is 0.1 to 0.9 times the diameter with respect to a cylinder inner wall F. Portions formed by flight vertexes of the disks B with respect to the cylinder inner wall F are tip portions G.

For the other types of kneading wings, there is a backward flight, a seal ring, a rotor and a kneading wing that flight tips are slanted at a helix angle $\theta$ to a screw shaft direction, as disclosed in JP-A-2005-35212.

Next, an operation will be described below.

In FIG. 14, a solid plastic material supplied from the feed port 5 is transported to the plasticization kneading portion 9 by the screws 2. The plasticization kneading portion 9 is configured by fitting together with the FK, BK and CK as shown in FIGS. 16A to 16C. The plasticization kneading portion 9 melts and kneads the solid plastic material within a short period of time. The molten plastic material at the plasticization kneading portion 9 is transported to the discharge port 7 while unnecessary volatile ingredients contained in the plastic material are removed through the first vent 6a of the molten material transporting portion 10. The molten plastic material is then discharged to an outside from the cylinder 1, with the material stranded in a shape from the discharge port 7. The molten plastic material discharged with the stranded shape is cut to pieces by a cutter (not shown) to form a pellet form. The cutter is placed directly on an exit of the discharge port 7 or on a position away from the exit. Unnecessary solid impurities contained in the molten plastic material may also be filtered by a screen 19 installed at front of the discharge port 7.

In FIGS. 15A and 15B, the solid plastic material supplied from the feed port 5 is transported to the plasticizing kneading portion 9 by the screws 2. The plasticization kneading portion 9 is configured by fitting together with the FK, BK and CK as shown in FIGS. 16A to 16C. The plasticization kneading portion 9 melts and kneads the solid plastic material within a short period of time. The molten plastic material in the plasticization kneading portion 9 is transported to the second kneading portion 12 while unnecessary volatile ingredients contained in the plastic material are removed through the first vent 6a of the first molten material transporting portion 10a. The side feeder 11 is installed at the first molten material transporting portion 10a. The side feeder 11 supplies solid sub-material (plastic, organic filler, inorganic filler, glass fiber, etc.) to the molten plastic material. The molten plastic material and solid sub-material are kneaded by the second kneading portion 12. The second kneading portion 12 is similar to the first kneading portion 9, and configured by the FK, BK and CK as shown in FIGS. 16A to 16C. The second kneading portion 12 melts, kneads and disperses the molten plastic material and solid sub-material within a short period of time. The molten, kneaded and dispersed compound material is transported to the discharge port 7 while the unnecessary volatile ingredients contained in the plastic material are removed through the second vent 6b of the second molten material transporting portion 10b, and discharged to the outside from the cylinder 1, with the material stranded in a shape, through the discharge port 7. The molten plastic material discharged with the stranded shape is then cut to pieces by a cutter (not shown) to form a pellet form. The cutter is placed directly on an exit of the discharge port 7 or on a position away from the exit. Unnecessary solid impurities contained in the molten plastic material may also be filtered by a screen 19 installed at front of the discharge port 7.

The plasticization kneading extruder for plastic material of related art has the structure as described above, and carries out the kneading for plasticization of solid plastic material, the melting, kneading and dispersion of the molten plastic material and sub-material within a short period of time, and then discharges the material.

The plasticization kneading portion 9 is configured by fitting together with a feed wing, a return wing and a neutral wing, in which the feed wing FK has a performance to transport the plastic material to the downstream of cylinder, the return wing BK has a performance to return it to the upstream of cylinder, and the neutral wing has no performance of transporting the material. These wings can be conformed to the property of plastic material and a demanded quality for the plastic compound material to be obtained from the kneading. The plasticization kneading portion 9 has a function of pushing the solid plastic material into a narrow clearance of the kneading wings, the clearance being formed between the cylinder inner wall F and the kneading wings by rotating the screws 2, while the solid plastic material transported from the solid transporting portion 8 is blocked to certain extent by the fitted together with kneading wings. The plastic material is then transformed to a molten state from the solid by the shear stress or energy generated at the clearance.

The molten kneading dispersion portion 12 for dealing with the molten plastic material and sub-material has also a function similar to that of the plasticization kneading portion 9. Thus, melting, kneading and dispersion are carried out at the clearance formed between the cylinder inner wall F and the kneading wings.

In the case of the respective kneading wings of disk type of related art which has the plasticization kneading portion 9 and molten kneading dispersion portion 12, in consideration of a piece of disk, this single disk has no performance to transport the material to the forward or backward in the cylinder, so that the plastic material may flow with a dwelling state caused by a pressure difference. For this reason, a great amount of the plastic material is blocked at the narrow clearance formed between the cylinder inner wall F and kneading wings, particularly at the tip portion G. Moreover, a local large force (inner pressure) is generated because the plastic material is pushed into the narrow clearance of the kneading wings owing to the rotation of screws 2. Particularly, there has been a problem that the cylinder inner wall F and/or the tip portion G is abraded away because the tip portion G of one kneading wing paired with the other tip portion G where a pressure is generated at both the tip portions of kneading wing, is contacted with the cylinder inner wall F.

In the molten kneading dispersion portion 12, there has also been a problem that the filler is condensed or clumped together, and the dispersion state of the filler becomes worse because of the force (inner pressure) generated at the tip portion G by the cylinder inner wall F and the tip of the kneading wing.

The kneading wing having the performance of the forward or backward transportation include types of a backward flight and a rotor. The backward transportation flight is a screw type kneading wing coupled with a flight having a performance of the backward transportation. Thus, there is no clearance between the disks in the disk type kneading wings of related art. The blocking performance against the solid plastic material is therefore high, and a relatively high pressure is generated at the clearance formed between the cylinder inner wall F and the kneading wings, in comparison with the disk type kneading wings of related art.

The rotor type is a screw type kneading wing coupled with a flight having a performance of the forward or backward transportation. The forward transportation rotor has no clearance between the disks in the disk type kneading wings of related art and has high performance of the forward transportation. Thus, the plastic material cannot be blocked by a single unit of the kneading wing. Because of this, in the case where the forward transportation rotor is incorporated in the plasticization kneading portion 9, the forward transportation rotor must be fitted together with the kneading wings having the blocking function. In this way, the forward transportation rotor can provide the shear stress or energy to the plastic material in such a way that the plastic material is blocked by the kneading wings having the blocking function. However, a great amount of the plastic material is pushed into the tip portions because the flights are coupled one another. Thus, a local large force (inner pressure) is generated at the tip portions. The backward transportation rotor has no clearance between the disks in the disk type kneading wings of related art and has high performance for the backward transportation. Because of this, the backward transportation rotor has a similar function to the backward transportation flight and generates a relatively high pressure in comparison with the disk type kneading wing of related art.

SUMMARY OF THE INVENTION

An object of the invention is to provide a plasticization kneading extruder for plastic material which can enhance to reduce an inner pressure generated at the plasticization kneading portion and molten kneading dispersion portion and reduce abrasion of the cylinder and screws, and enhance the dispersion of filler without producing a condensed product caused by the kneading.

According to a first aspect of the invention, there is provided a kneading extruder plastic material comprising: a cylinder capable of heating and cooling; and twin screws provided in the cylinder, the twin screws including in order from an upstream side thereof: a solid transporting portion; a plasticization kneading portion; and a first molten material transporting portion, wherein: the kneading extruder includes twist kneading disks having a length of more than 1.88 times a cylinder inner diameter D; the twist kneading disks comprise a plurality of disks, a width of each disk being 0.1 to 0.5 times the cylinder inner diameter D; a helix angle $\theta$ between a vertex of one surface side of the disk and a vertex of another surface side of the disk at a tip portion is in a range of $0°<\theta<90°$ in a reverse rotating direction of the screws, as viewed from a cross section of the disk having a normal line equivalent to a screw shaft in an end direction of the screw shaft; and a phase angle E in correlation between the disks around the screw shaft is in a range of $0°<E<90°$.

According to a second aspect of the invention, the cylinder includes in order from the upstream side thereof: a feed port of material; a first vent; and a discharge port.

According to a third aspect of the invention, the twist kneading disks are incorporated in the plasticization kneading portion.

According to a fourth aspect of the invention, the twin screws further includes in order from the upstream side thereof: a molten kneading dispersion portion provided in a downstream of the first molten material transporting portion; and a second molten material transporting portion.

According to a fifth aspect of the invention, between the first vent and the discharge port, the cylinder includes in order from the upstream thereof: a side feeder; and a second vent.

According to a sixth aspect of the invention, the twist kneading disks are incorporated in at least one of the plasticization kneading portion and the molten kneading dispersion portion.

According to a seventh aspect of the invention, the twist kneading disks are incorporated in the molten kneading dispersion portion.

According to an eighth aspect of the invention, the twist kneading disks are incorporated in the plasticization kneading portion.

According to a ninth aspect of the invention, the twist kneading disks are incorporated in the plasticization kneading portion and the molten kneading dispersion portion.

According to a tenth aspect of the invention, the kneading extruder further comprising: cross kneading disks in a downstream of the twist kneading disks.

According to an eleventh aspect of the invention, the kneading extruder further comprising: forward kneading disks interposed between the twist kneading disks and the cross kneading disks.

In the invention, the kneading extruder includes a cylinder 1 and twin screws 2. The cylinder 1 capable of heating and cooling includes in order from the upstream side thereof a feed port 5 of material, a first vent 6a and a discharge port 7. The twin screws 2 provided in the cylinder 1 include in order from an upstream side thereof a solid transporting portion 8, a plasticization kneading portion 9 and a molten material transporting portion 10.

Incidentally, the cylinder 1 may include in order from the upstream side thereof a feed port 5 for material, a first vent 6a, a side feeder 11, a second vent 6b and a discharge port 7. The twin screws 2 may include in order from the upstream side thereof a solid transporting portion 8, a plasticization kneading portion 9, a first molten material transporting portion 10a, a molten kneading dispersion portion 12, and a second molten material transporting portion 10b.

In the invention, the kneading disks (hereinafter, twist kneading disk: TKD) are arranged such that the width of a piece of disk B is 0.1 to 0.5 times the cylinder inner diameter D; the helix angle θ as an angle between a vertex of the front surface side of the disk B and a vertex of the rear surface side of the disk B at the tip portion G is slanted at the angle to a range of $0°<\theta<90°$ in the reverse rotating direction of the screws, as viewed from a cross section of the disk having a normal line equivalent to the screw shaft in the end direction of the screw shaft; and the phase angle E of the respective disks is in a range of $0°<E<90°$, and the twist kneading disks are incorporated in the plasticization kneading portion 9 and molten kneading dispersion portion 12 in the position at the length of more than 1.9 times the cylinder inner diameter D. Accordingly, the inner pressure generated at the plasticization kneading portion 9 and the molten kneading dispersion portion 12 can be reduced.

The TKD has a performance to transport the plastic material to the forward because the helix angle θ as an angle between a vertex of the front surface side of the disk B and a vertex of the rear surface side of the disk B at the tip portion G is slanted to a range of $0°<\theta<90°$ in the reverse rotating direction of the screws, as viewed from cross section of the disk having a normal line equivalent to the screw shaft in the end direction of the screw shaft. Accordingly, unlike the related art that generates a local large force (inner pressure) at a piece of the disk on the kneading wings, the local large force (inner pressure) is not generated. Therefore, appropriate amount of shear stress or energy can be given to the solid plastic material.

The plastic material is melted at the molten kneading dispersion portion 12. Therefore, a case of generating a local large force (inner pressure) at the tip portion of the disk is little. However, among the various fillers, there exists filler having the property of condensed product caused by a pressure generated at the tip portion. Therefore, it is necessary to reduce the generated pressure. By incorporating the TKD in a part of the molten kneading dispersion portion 12 of such filler, the generated pressure can be reduced, and the condensed product due to the kneading is not produced.

As described above, according to the invention, the twist kneading disks having the foregoing predetermined requirements are incorporated in the plasticization kneading portion in the position at the length of more than 1.9 times the cylinder inner diameter. Therefore, the inner pressure generated at the plasticization kneading portion is reduced, and the abrasion of the cylinder and screws can be reduced.

Further, according to the invention, the twist kneading disks having the foregoing predetermined requirements are incorporated in the plasticization kneading portion in the position at the length of more than 1.9 times the cylinder inner diameter. Therefore, the inner pressure generated at the plasticization kneading portion is reduced, and an energy given to the solid plastic material is reduced, thus, it is possible to perform the extrusion in low temperature.

Still further, according to the invention, the twist kneading disks having the foregoing predetermined requirements are incorporated in the molten kneading dispersion portion in the position at the length of more than 1.9 times the cylinder inner diameter. Therefore, the inner pressure generated at the molten kneading dispersion portion is reduced, and the dispersion of filler can be enhanced without producing a condensed product from the filler.

BRIEF DESCRIPTION OF THE DRAWINGS

FIGS. 16A to 16C are side views showing examples of the kneading wings and cross section views as viewed from the kneading wings in the arrows A-A direction, in which FIG. 16A shows a feeding wing (forward kneading: FK), FIG. 16B shows a return wing (backward kneading: BK), and FIG. 16C shows a neutral wing (cross kneading: CK).

DETAILED DESCRIPTION OF THE PREFERRED EMBODIMENTS

Hereinafter, the embodiments of the present invention will be described with reference to the drawings. A schematically illustrated twin-screw extruder is the same as that described in the related art, therefore, the detailed description of that is omitted.

The helix angle θ of the tip portion G to be described in the following embodiments is an angle between a vertex a of the front surface side of one disk and a vertex b of the rear surface side of that, when the TKD is viewed from an end direction of the screw shaft. The helix angle is in a range of 0°<θ<90° in a reverse rotating direction of screws, as viewed from a cross section indicated by the arrows A-A (cross section of the disk having a normal line equivalent to the screw shaft) on the disk in the end direction of the screw shaft (referring to FIG. 3).

The phase angle E of each disk (B) on the TKD is a shift angle in correlation between the disks around the screw shaft, which is in a range of 0°<E<90°.

Embodiment 1

In the embodiment, a resin was kneaded under the following condition, and an inner pressure generated from the kneading was measured.

Model: TEX65α-28BW-V (The Japan Steel Works Ltd.: common direction engaged twin screw extruder: cylinder inner diameter D=φ69 mm)

Material: polycarbonate (powder form)

Operation condition: process quantity Q=374 kg/h and screw revolution Ns=252 rpm Cylinder temperature setting for the plasticization kneading portion: 285° C.

Figure 1:
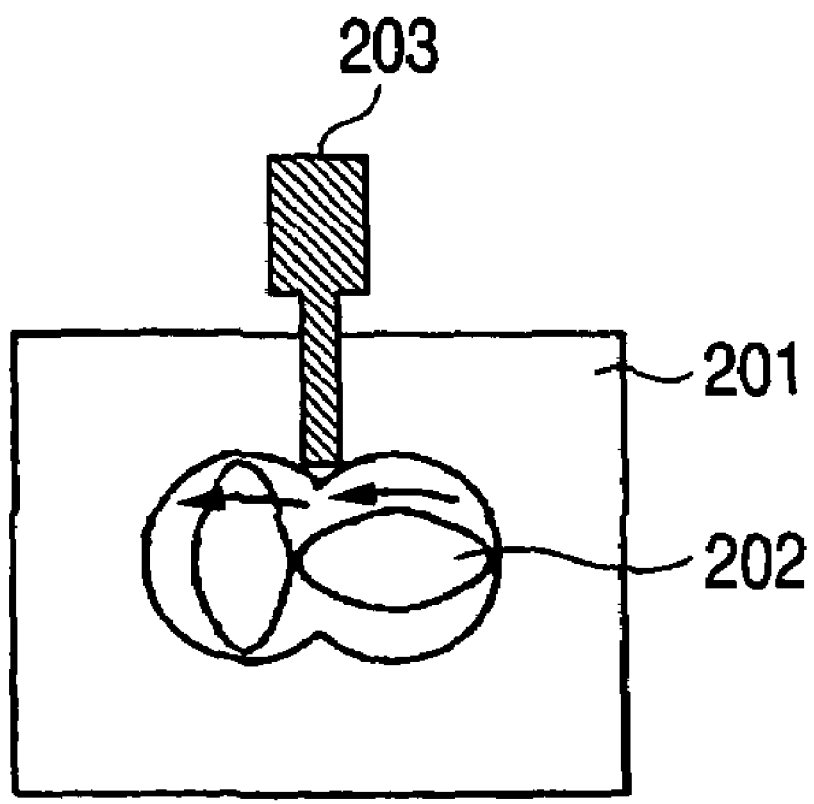
FIG. 1 is a diagram showing installation positions of pressure indicators, as viewed from a cross section of the screw in the screw shaft direction in the embodiment 1.
Figure 2:
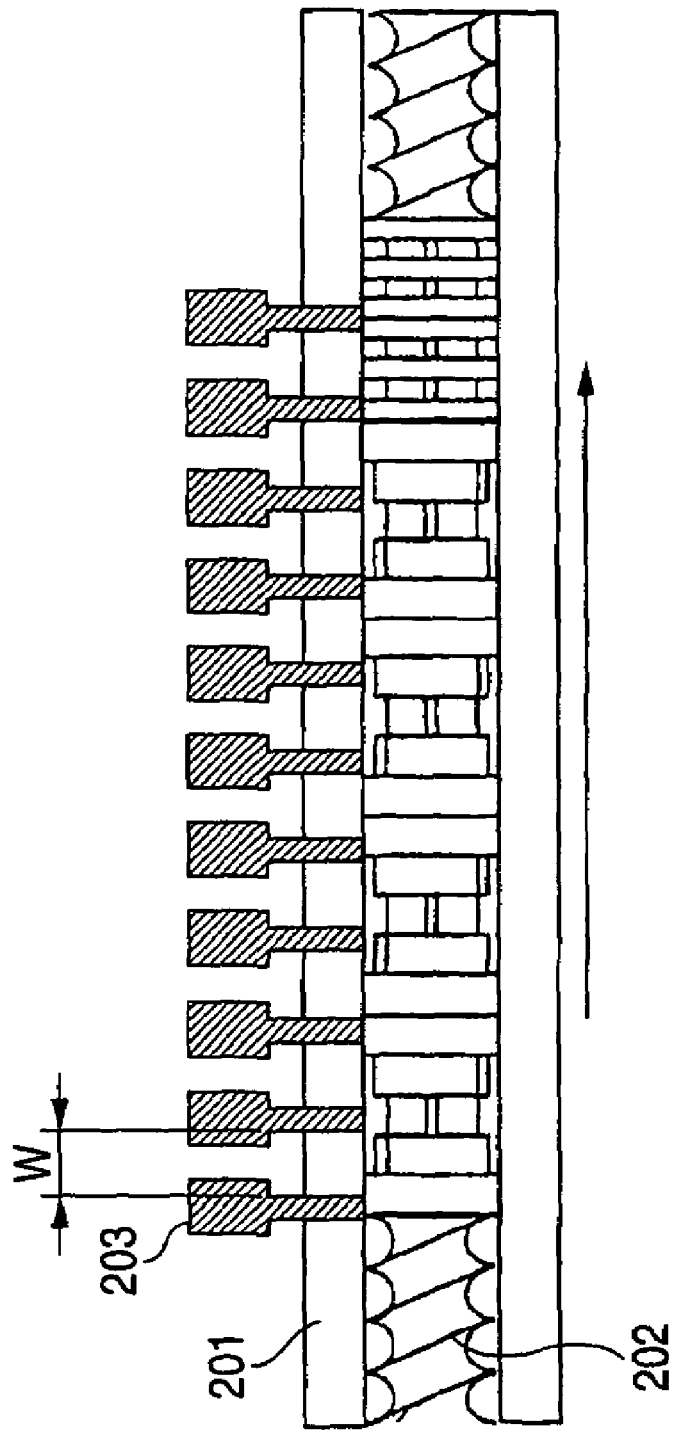
FIG. 2 is a diagram showing installation positions of pressure indicators in the screw shaft direction in the embodiment 1.

Inner Pressure Measurement Method:

FIG. 1 shows installation positions of pressure indicators in a cross section direction of the screw shaft. FIG. 2 shows installation positions of the pressure indicators in the screw shaft direction.

Pressure indicators 203 were installed at engaging portions of twin screws 202 provided in a cylinder 201. End portions of pressure indicators 203 were inserted up to substantially the same place at the inner diameter of cylinder 201. Eleven units of the pressure indicators 203 were used and placed in a distance every W=0.5 D (D: cylinder inner diameter) on the cylinder. The cylinder 201 was used with a hydraulic unit which is not shown in the drawing. Inner pressure data was then obtained while the cylinder 201 is moved every about 0.05 D in distance by a hydraulic cylinder having about 0.5 D stroke.

Figures 3A, 3B:
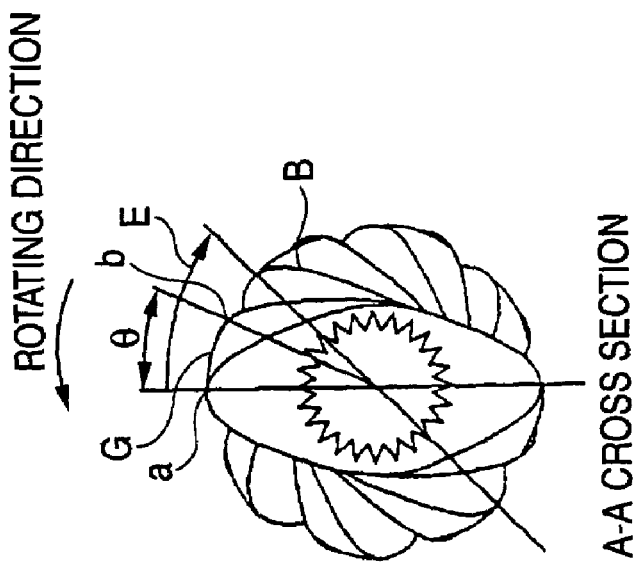
FIG. 3A is a side view showing the configuration of TKD (twist kneading disk)
FIG. 3B is a cross section view of TKD indicated by the arrows A-A shown in FIG. 3A.

Screw Configuration:

FIG. 3A is a side view showing a TKD configuration of the embodiment. FIG. 3B is a section view of the TKD in a direction of the arrows A-A (the disk having a normal line equivalent to the screw shaft, and the section view of TKD which is viewed from the end direction of the screw shaft: hereinafter, as referred to the cross section A-A) shown in FIG. 3A. The screw shaft is illustrated by a dotted line in FIG. 3A.

Figure 4:
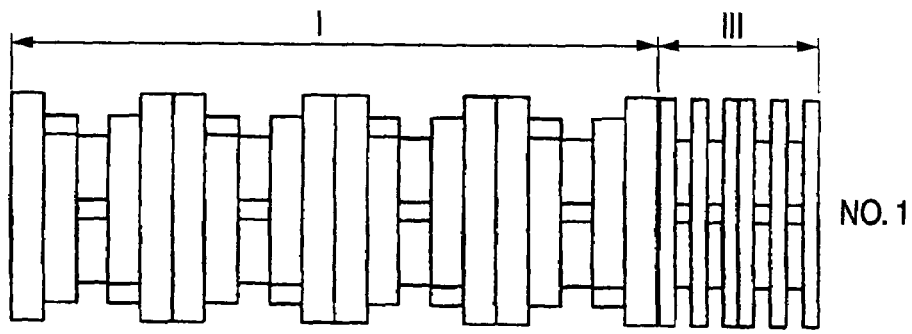
FIG. 4 is a schematic diagram showing the configuration of No. 1 screw in the plasticization kneading portion in the embodiment 1.
Figure 5:
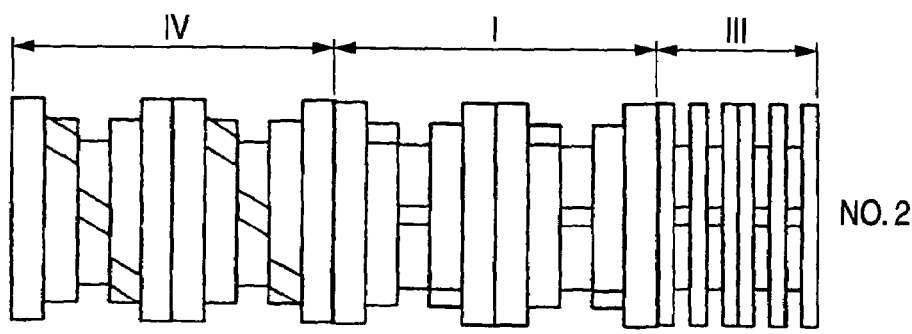
FIG. 5 is a schematic diagram showing the configuration of No. 2 screw in the plasticization kneading portion in the embodiment 1.
Figure 6:
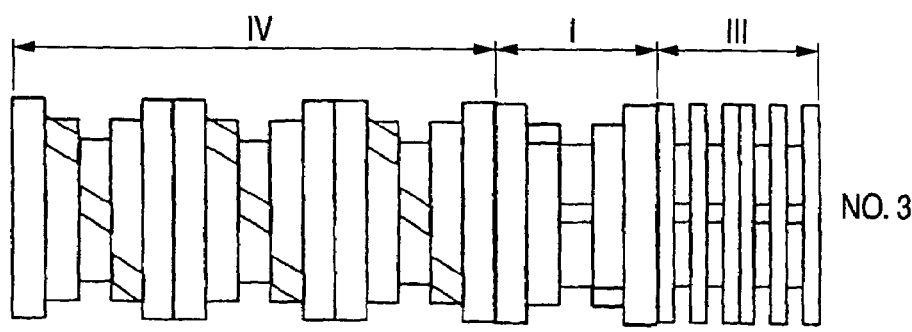
FIG. 6 is a schematic diagram showing the configuration of No. 3 screw in the plasticization kneading portion in the embodiment 1.

FIGS. 4, 5 and 6 show configurations of plasticization kneading portions for the screws used in the embodiment.

FIG. 4 is a side view of the screw using the kneading wing of related art. The screw shown in FIG. 4 is named as a No. 1 screw.

Five sets of the FK are arranged such that the width of a piece of disk B is 0.19 times the cylinder inner diameter D and a phase angle E of each disk B is shifted in a position at 45 degrees one another, and the five sets of FK are incorporated in a position of the cylinder at the length of 3.77 times the cylinder inner diameter D (in a range I shown in the drawing). Five sets of the CK are arranged such that the width of a piece of disk B is 0.09 times the cylinder inner diameter D and the phase angle E of each disk B is shifted in a position at 90 degrees one another, and the five sets of CK are incorporated in a position of a downstream side of the FK at the length of 0.94 times the cylinder inner diameter D (in a range III shown in the drawing).

FIG. 5 is a side view of the screw using the TKD shown in FIG. 3. The screw shown in FIG. 5 is named as a No. 2 screw.

Five sets of the TKD are arranged such that the width of a piece of disk B is 0.19 times the cylinder inner diameter D; a helix angle θ as an angle between a vertex a of a front surface side of the disk B and a vertex b of a rear surface side of the disk B at a tip portion G of the disk B is slanted at about 11 degrees to a reverse rotating direction of the screws, as viewed from the cross section A-A of disk B in the end direction of the screw shaft; and a phase angle E of each disk B is shifted in a position at 45 degrees one another, and the five sets of TKD are incorporated in a position of the cylinder at the length of about 1.88 or 1.9 times the cylinder inner diameter D (in a range IV shown in the drawing). Five sets of the FK are arranged such that the width of a piece of disk B is 0.19 times the cylinder inner diameter D and a phase angle E of each disk B is shifted in a position at 45 degrees one another, and the five sets of FK are incorporated in a position of a downstream side of the TKD at the length of about 1.88 times the cylinder inner diameter D (in the range I shown in the drawing). Further, five sets of the CK are arranged such that the width of a piece of disk B is 0.09 times the cylinder inner diameter and a phase angle E of each disk B is shifted in a position at 90 degrees one another, and the five sets of CK are incorporated in a position of a downstream side of the FK at the length of 0.94 times the cylinder inner diameter D (in the range III shown in the drawing).

FIG. 6 is a side view of the screw using the TKD shown in FIG. 3. The screw shown in FIG. 6 is named as a No. 3 screw.

Five sets of the TKD are arranged such that the width of a piece of disk B is 0.19 times the cylinder inner diameter D; a helix angle θ as an angle between a vertex a of a front surface side of the disk B and a vertex b of a rear surface side of the disk B at a tip portion G of the disk B is slanted at about 11 degrees to a reverse rotating direction of the screws, as viewed from the cross section A-A of disk B in the end direction of the screw shaft; and a phase angle E of each disk B is shifted in a position at 45 degrees one another, and the five sets of TKD are incorporated in a position of the cylinder at the length of about 2.83 or 1.9 times the cylinder inner diameter D (in a range IV shown in the drawing) Five sets of the FK are arranged such that the width of a piece of disk B is 0.19 times the cylinder inner diameter D and a phase angle E of each disk B is shifted in a position at 45 degrees one another, and the five sets of FK are incorporated in a position of a downstream side of the TKD at the length of about 0.94 times the cylinder inner diameter D (in the range I shown in the drawing). Further, five sets of the CK are arranged such that the width of a piece of disk B is 0.09 times the cylinder inner diameter and a phase angle E of each disk B is shifted in a position at 90 degrees one another, and the five sets of CK are incorporated in a position of a downstream side of FK at the length of 0.94 times the cylinder inner diameter (in the range III shown in the drawing).

Measured Results:

A value of the maximum inner pressure generated at the No. 1 screw shown in FIG. 4 is assumed as 100%. Ratio to the maximum inner pressure values generated at the No. 2 and 3 screws shown in FIGS. 5 and 6, and values of the specific energy (energy that is supplied to a plastic material per 1 kg by the extruder), were recorded as Table

TABLE 1

| Screw type | Incorporated length of TKD (L/D) | Ratio of maximum generated inner pressure value (%) | Specific energy (kWh/kg) |
|---|---|---|---|
| No. 1 | 0 | 100 | 0.171 |
| No. 2 | 1.88 | 79 | 0.170 |
| No. 3 | 2.83 | 71 | 0.166 |

According to Table 1, each of the maximum inner pressures of the No. 2 and No. 3 screws incorporating the TKD in the plasticization kneading portion was dropped from that pressure generated at the No. 1 screw incorporating the kneading wing of related art.

The No. 2 screw incorporates the TKD in a position of the screw at the length of about 1.88 times (or about 1.9 times) the cylinder inner diameter D. Accordingly, the maximum inner pressure was able to drop to 79% compared to that of the No. 1 screw.

Incidentally, the specific energy given to the plastic material of No. 2 screw is substantially the same compared with that of the No. 1 screw. Thus, the specific energy may not be reduced, even though the TKD is incorporated in the position at the length less than 1.88 times the cylinder inner diameter D.

The No. 3 cylinder in corporates the TKD in the position at the length of 2.83 times the cylinder inner diameter D. Accordingly, the specific energy given to the plastic material of the No. 3 cylinder was more reduced to that of the No. 1 cylinder. Moreover, the generated maximum inner pressure of No. 3 cylinder was also reduced to 71%.

From the result described above, the specific energy can be reduced to that equal to or less than the related art in such a way that the TKD is incorporated in the position of the screw at the length of about 1.88 times or more of the cylinder inner diameter D. Since the maximum inner pressure can be reduced to 79% or less, it is not necessary to supply excessive energy to the plastic material. It is apparent that there is effect to reduce the abrasion of the cylinder and screws.

Embodiment 2

In the embodiment, a resin was kneaded under the following condition, and the specific energy was obtained (energy that is supplied to a plastic material per 1 kg by the extruder) in the kneading.

Model: TEX65α-35BW-V (The Japan Steel Works Ltd.: common direction engaged twin screw extruder: cylinder inner diameter D=φ69 mm)

Material: ABS (74 wt. %)+AS (26 wt. %) compound material

ABS: φ10 mm×2 mm in thickness, flake form

AS: pellet form

Operation condition: process quantity Q=900 kg/h and screw revolution Ns=390 rpm Cylinder temperature setting for the plasticization kneading portion: 200° C.

Figure 7:
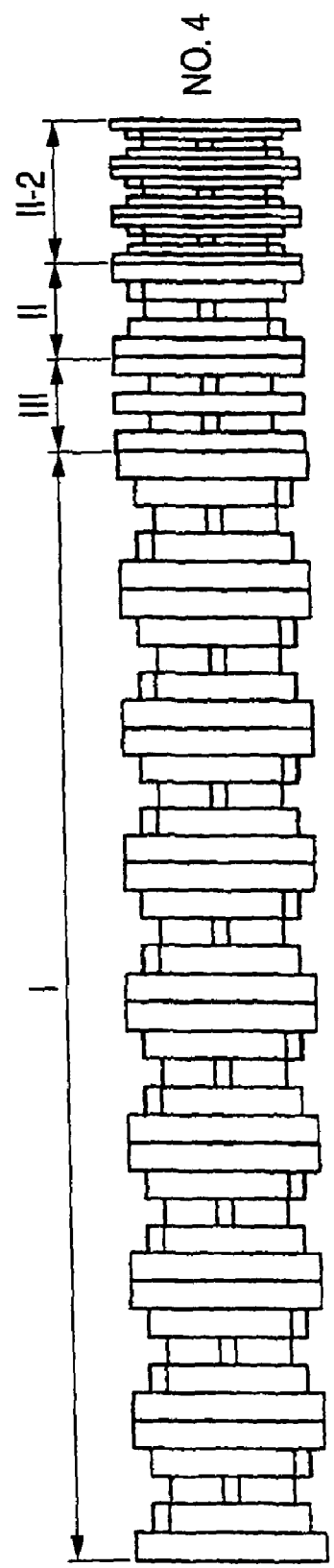
FIG. 7 is a schematic diagram showing the configuration of No. 4 screw in the plasticization kneading portion in the embodiment 2.
Figure 8:
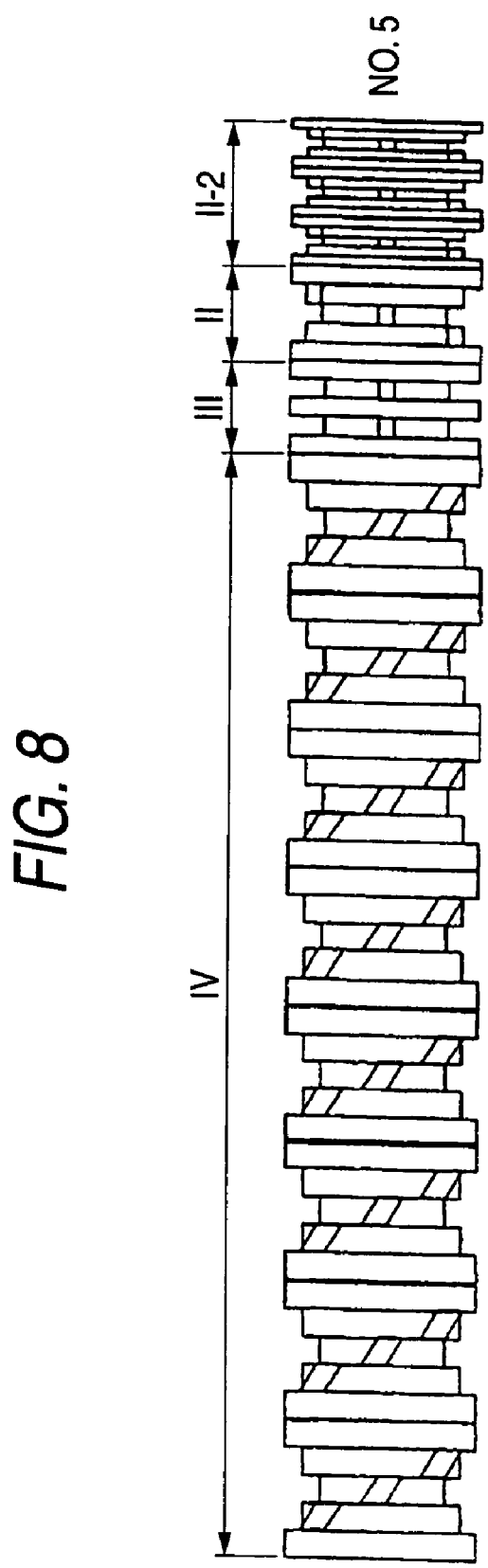
FIG. 8 is a schematic diagram showing the configuration of No. 5 screw in the plasticization kneading portion in the embodiment 2.
Figure 9:
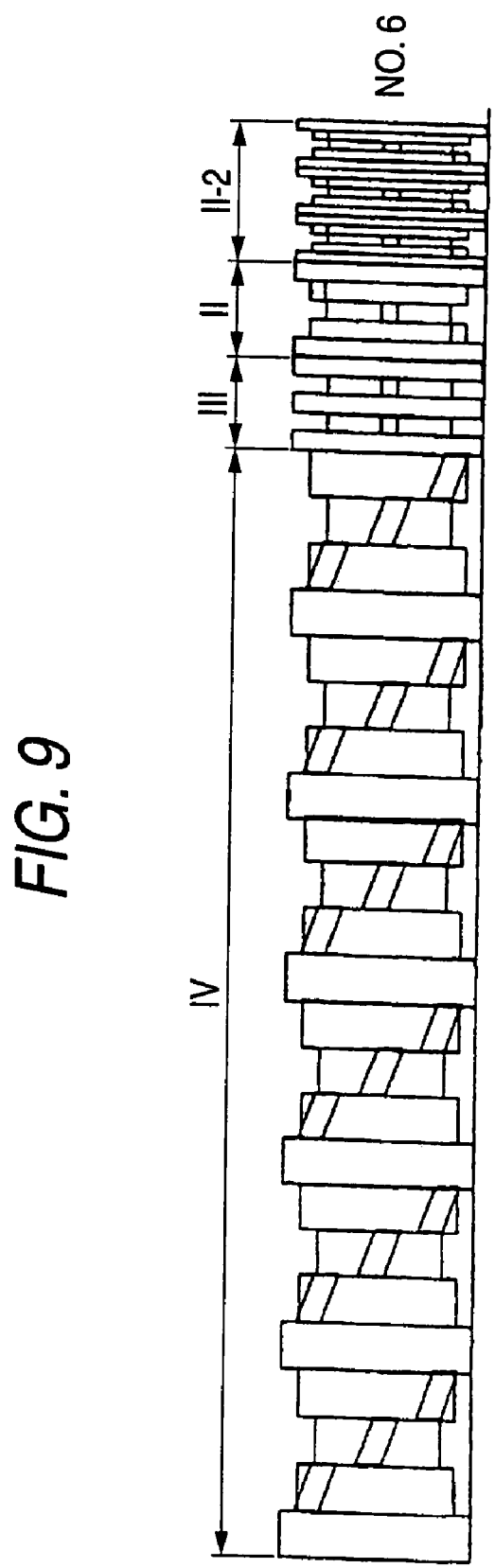
FIG. 9 is a schematic diagram showing the configuration of No. 6 screw in the plasticization kneading portion in the embodiment 2.

Screw Shape:

FIGS. 7, 8 and 9 show configurations of the plasticization kneading portion of the screw used in the embodiment.

FIG. 7 is a side view of the screw using a kneading wing of related art. The screw shown in FIG. 7 is named as a No. 4 screw.

Five sets of the FK are arranged such that the width of apiece of disk B is 0.3 times the cylinder inner diameter D and a phase angle E of each disk B is shifted in a position at 45 degrees one another, and the five sets of FK are incorporated in a position of the cylinder at the length of 12 times the cylinder inner diameter D (in a range I shown in the drawing). Five sets of CK are arranged such that the width of a piece of disk B is 0.2 times the cylinder inner diameter D and the phase angle E of each disk B is shifted in a position at 90 degrees one another, and the five sets of CK are incorporated in a position of a downstream side of the FK at the length of 1.0 time the cylinder inner diameter D (in a range III shown in the drawing). Further, Five sets of the BK are arranged such that the width of a piece of disk B is 0.2 times the cylinder inner diameter D and a phase angle E of each disk B is shifted in a position at 45 degrees one another, and the five sets of BK are incorporated in a position of a downstream side of the CK at the length of 1.0 time the cylinder inner diameter D (in a range II shown in the drawing). Five sets of the BK are arranged such that the width of a piece of disk B is 0.1 time the cylinder inner diameter D and the phase angle E of each disk B is shifted in a position at −45 degrees one another, and the five sets of BK are incorporated in a position of a downstream side of BK at the length of 1.5 times the cylinder inner diameter D (in a range II-2 shown in the drawing).

FIG. 8 is a side view of the screw using the TKD shown in FIG. 3. The screw shown in FIG. 8 is named as a No. 5 screw.

Five sets of the TKD are arranged such that the width of a piece of disk B is 0.3 times the cylinder inner diameter D; a helix angle θ as an angle between a vertex a of a front surface side of the disk B and a vertex b of a rear surface side of the disk B at a tip portion G of the disk B is slanted at about 17 degrees to a reverse rotating direction of the screws, as viewed from the cross section A-A of disk B in the end direction of the screw shaft; and a phase angle E of each disk B is shifted in a position at 45 degrees one another, and the five sets of TKD are incorporated in a position of the cylinder at length of about 12 times the cylinder inner diameter D (in a range IV shown in the drawing). Five sets of the CK are arranged such that the width of a piece of disk B is 0.2 times the cylinder inner diameter D and a phase angle E of each disk B is shifted in a position at 90 degrees one another, and the five sets of CK are incorporated in a position of a downstream side of TKD at the length of about 1.0 time the cylinder inner diameter D (in the range III shown in the drawing). Further, five sets of the BK are arranged such that the width of a piece of disk B is 0.2 times the cylinder inner diameter D and a phase angle E of each disk B is shifted in a position at –45 degrees one another, and the five sets of BK are incorporated in a position of a downstream side of the CK at the length of 1.0 time cylinder inner diameter D (in the range II shown in the drawing). Five sets of the BK are also arranged such that the width of a piece of disk B is 0.1 time the cylinder inner diameter D and a phase angle E of each disk B is shifted in a position at –45 degrees one another, and the five sets of BK are incorporated in a position of a downstream side of BK at the length of 1.5 times the cylinder inner diameter D (in the range II-2 shown in the drawing).

FIG. 9 is a side view of the screw using the TKD shown in FIG. 3. The screw shown in FIG. 9 is named as a No. 6 screw.

Four sets of the TKD are arranged such that the width of apiece of disk B is 0.5 times the cylinder inner diameter D; a helix angle θ as an angle between a vertex a of a front surface side of the disk B and a vertex b of a rear surface side of the disk B at a tip portion G of the disk B is slanted at about 30 degrees to a reverse rotating direction of the screw, as viewed from the cross section A-A of disk B in the end direction of the screw shaft; and a phase angle E of each disk B is shifted in a position at 45 degrees one another, and the four sets of TKD are incorporated in a position of the cylinder at the length of about 12 times the cylinder inner diameter D (in a range IV shown in the drawing). Five sets of the CK are arranged such that the width of a piece of disk B is 0.2 times the cylinder inner diameter D and a phase angle E of each disk B is shifted in a position at 90 degrees one another, and the five sets of CK are incorporated in a position of a downstream side of the TKD at the length of about 1.0 time the cylinder inner diameter D (in the range III shown in the drawing). Further, five sets of the BK are arranged such that the width of a piece of disk B is 0.2 times the cylinder inner diameter D and a phase angle E of each disk B is shifted in a position at –45 degrees one another, and the five set of BK are incorporated in a position of a downstream side of the CK at length of 1.0 time the cylinder inner diameter D (in the range II shown in the drawing). Five sets of the BK are also arranged such that the width of a piece of disk B is 0.1 time the cylinder inner diameter D and a phase angle E of each disk B is shifted in a position at –45 degrees one another, and the five sets of the BK are incorporated in a position of a downstream side of the BK at the length of 1.5 times the cylinder inner diameter D (in the range II-2 shown in the drawing).

Figure 10:
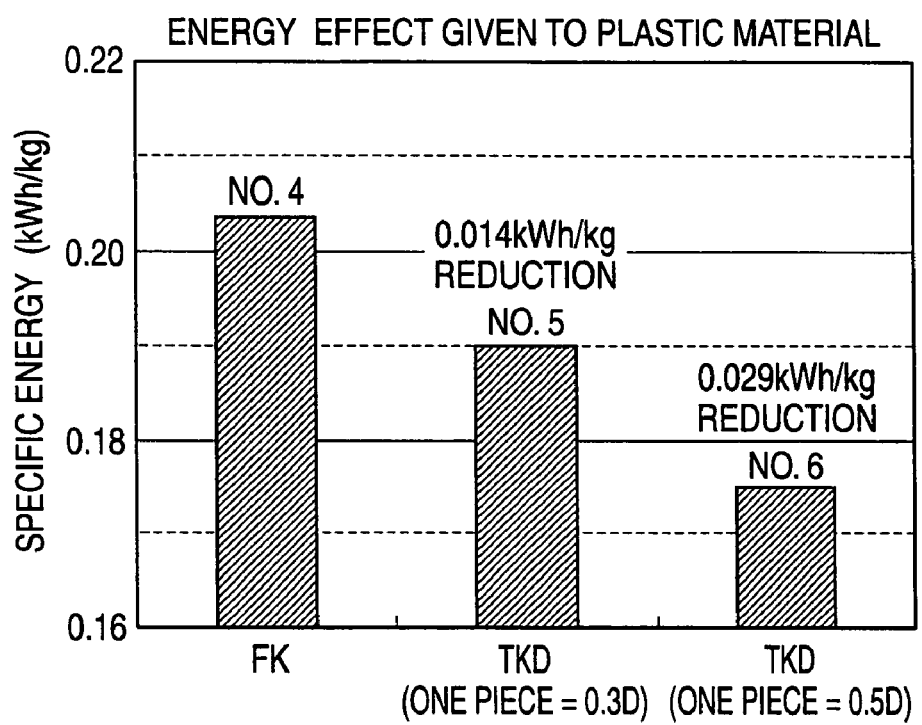
FIG. 10 is an experimental result in the embodiment 2, and a graph showing the comparisons of energy supplied to a plastic material in the cases of FK and TKD.
Figure 11:
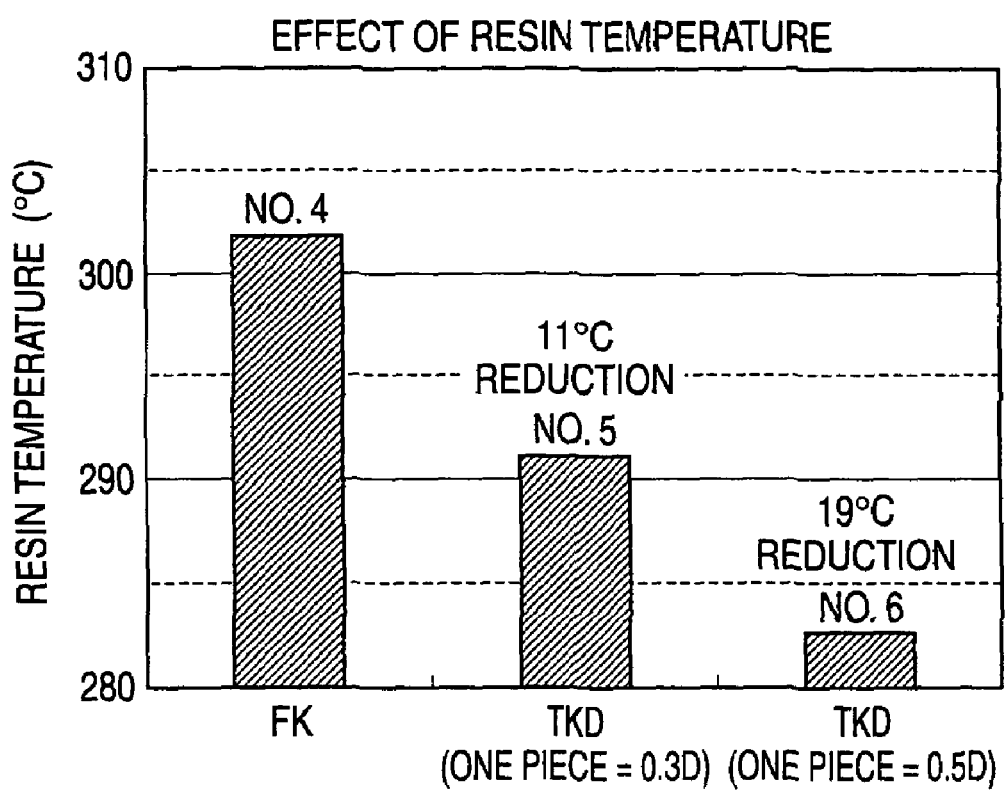
FIG. 11 is an experimental result in the embodiment 2, and a graph showing the temperature comparisons of a discharged resin in the cases of FK and TKD.

Results:

FIG. 10 shows a graph which compared the specific energies (energy that is supplied to a plastic material per 1 kg by the extruder) in the cases where the respective plasticization kneading portions are incorporated in the screws, respectively. FIG. 11 shows a graph which compared the resin temperatures of molten plastic discharged from the extruder in the cases where the respective plasticization kneading portions are incorporated in the screws, respectively.

As shown in FIG. 10, in the case where the TKD in which the width of a piece of disk B is 0.3 times the cylinder inner diameter D is incorporated in the plasticization kneading portion at the length of 12 times the cylinder inner diameter D (No. 5 screw), the specific energy was able to drop to 0.014 kwh/kg compared with that generated from the screw configuration (No. 4 screw) incorporating the kneading wing of related art. In the case where the TKD in which the width of a piece of disk B is 0.5 times the cylinder inner diameter D is incorporated in the plasticization kneading portion at the length of 12 times the cylinder inner diameter D (No. 6 screw), the specific energy was able to drop to 0.029 kWh/kg compared with that generated from the screw configuration (No. 4 screw) incorporating the kneading wing of related art.

As shown in FIG. 11, in the case where the TKD in which the width of a piece of disk B is 0.3 times the cylinder inner diameter D is incorporated in the plasticization kneading portion at the length of 12 times the cylinder inner diameter D (No. 5 screw), the resin temperature was able to drop to 11° C. compared with that of the molten plastic which was melted and discharged from the screw configuration (No. 4 screw) incorporating the kneading wing of related art. In the case where the TKD in which the width of a piece of disk B is 0.5 times the cylinder inner diameter D is incorporated in the plasticization kneading portion at the length of 12 times the cylinder inner diameter D (No. 6 screw), the resin temperature was able to drop to 19° C. compared with that of the molten plastic which was melted and discharged from the screw-configuration (No. 4 screw) incorporating the kneading wing of related art.

Embodiment 3

In the embodiment, a resin was kneaded under the following condition, and the dispersion property of titanium oxide was studied in the kneading.

Figure 15A:
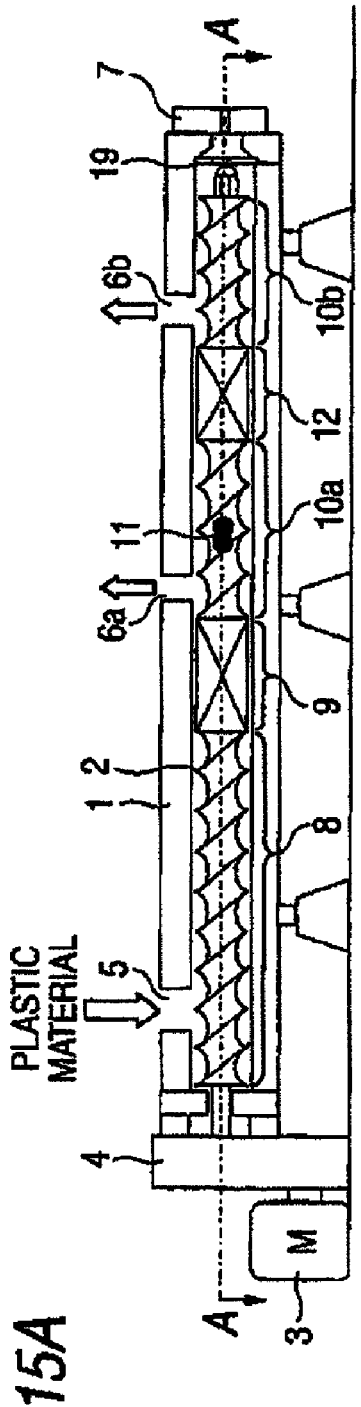
FIGS. 15A and 15B are schematic diagrams showing another example of the plasticization kneading extruder for plastic material of related art.
Figure 15B:
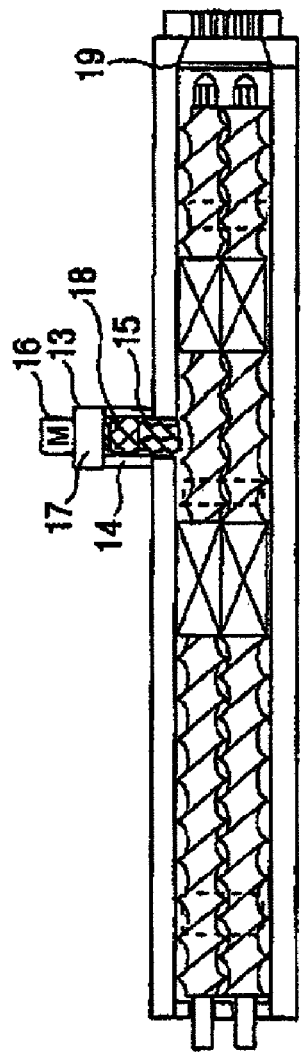
Figure 16C:
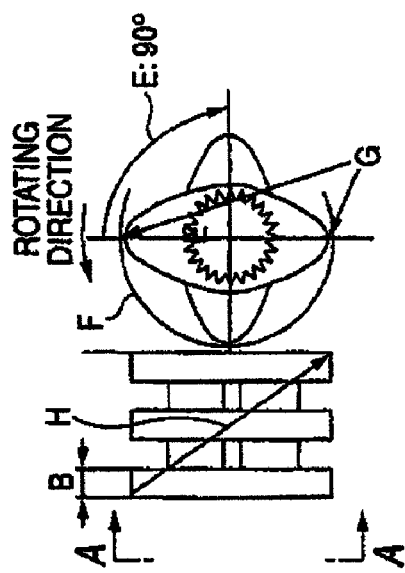
Figure 16B:
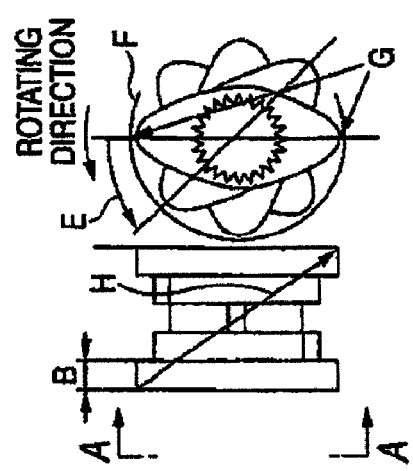
Figure 16A:
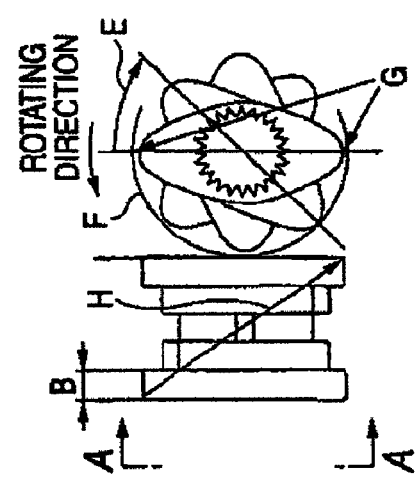

Model: TEX44α-42BW-2V (The Japan Steel Works Ltd.: common direction engaged twin screw extruder: cylinder inner diameter D=φ47 mm), which is substantially the same structure as that of the plasticization kneading extruder shown in FIGS. 15A and 15B.

Material: LDPE (40 wt. %)+titanium oxide (60 wt. %) compound material

LDPE: pellet form

Titanium oxide: powder form (Titanium oxide was supplied to the molten material transporting portion from the side feeder after LDPE was melted.)

Operation condition: process quantity Q=200 kg/h and screw revolution Ns=300 rpm Cylinder temperature setting for the molten kneading dispersion portion (second kneading portion): 100° C.

Figure 12:
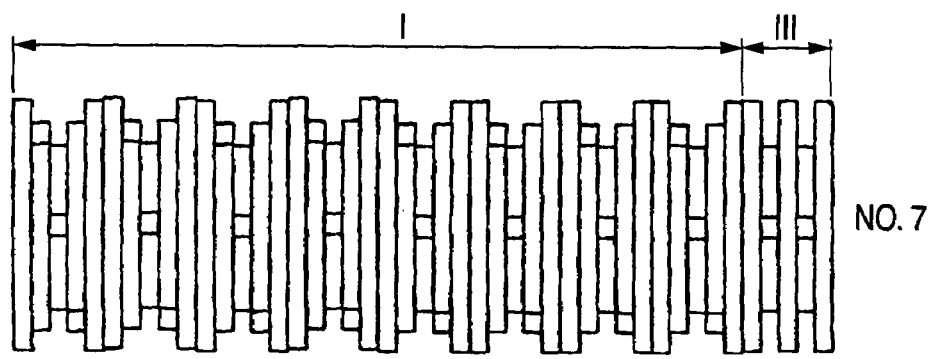
FIG. 12 is a schematic diagram showing the configuration of No. 7 screw in the plasticization kneading portion in the embodiment 3.
Figure 13:
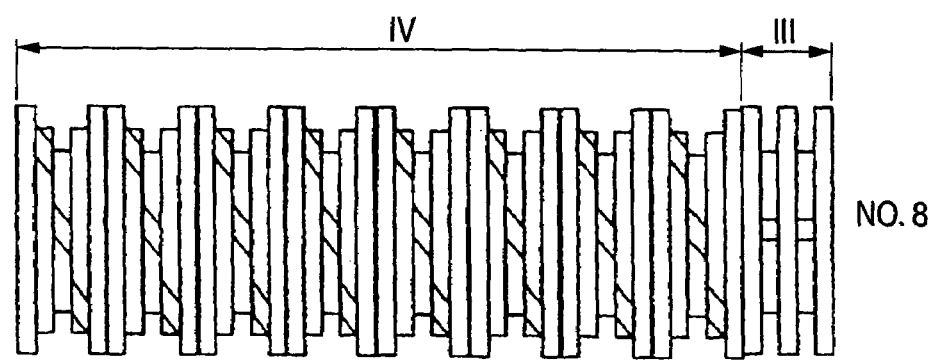
FIG. 13 is a schematic diagram showing the configuration of No. 8 screw in the plasticization kneading portion in the embodiment 3.
Figure 14:
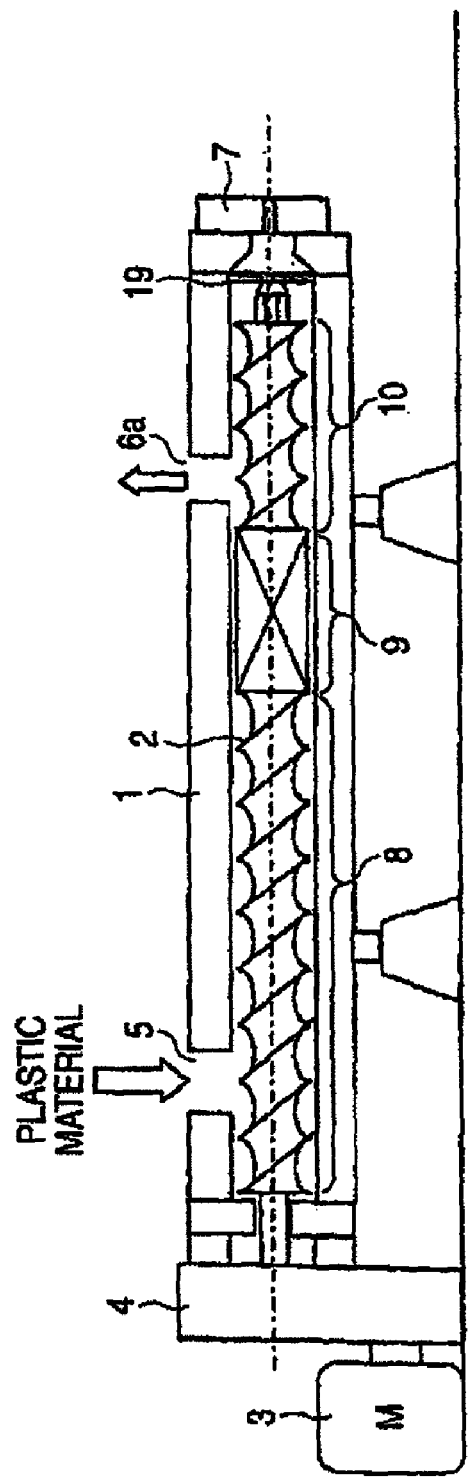
FIG. 14 is a schematic diagram showing one example of the plasticization kneading extruder for plastic material of related art.

Screw Configuration:

FIG. 12 and FIG. 13 show the screw configuration of the molten kneading dispersion portion (second kneading portion: the kneading portion after the filler is supplied from the side feeder).

FIG. 12 is a side view of the screw using the kneading wing of related art. The screw shown in FIG. 12 is named as a No. 7 screw.

Five sets of the FK are arranged such that the width of a piece of disk B is 0.1 time the cylinder inner diameter D and a phase angle E of each disk B is shifted in a position at 45 degrees one another, and the five sets of FK are incorporated in a position of the cylinder at the length of 4 times the cylinder inner diameter D (in a range I shown in the drawing). Five sets of CK are arranged such that the width of a piece of disk B is 0.1 time the cylinder inner diameter D and the phase angle E of each disk B is shifted in a position at 90 degrees one another, and the five sets of CK are incorporated in a position of a downstream side of FK at the length of 0.5 times the cylinder inner diameter D (in a range III shown in the drawing).

FIG. 13 is a side view of the screw using the TKD as shown in FIG. 3. The screw shown in FIG. 13 is named as a No. 9 screw.

Five sets of the TKD are arranged such that the width of a piece of disk B is about 0.1 time the cylinder inner diameter D; a helix angle θ as an angle between a vertex a of a front surface side of the disk B and a vertex b of a rear surface side of the disk B at a tip portion G of the disk B is slanted at about 5 degrees to a reverse rotating direction of the screws, as viewed from the cross section A-A of each disk B in the end direction of the screw shaft; and a phase angle E of each disk B is shifted in a position at 45 degrees one another, and the five sets of TKD are incorporated in a position of the cylinder at the length of about 4 times the cylinder inner diameter D (in a range IV shown in the drawing). Five sets of the CK are arranged such that the width of a piece of disk B is 0.1 time the cylinder inner diameter D and a phase angle E of each disk B is shifted in a position at 90 degrees one another, and the five sets of CK are incorporated in a position of a downstream side of TKD at the length of 0.5 times the cylinder inner diameter D (in the range III shown in the drawing).

Results:

The dispersion state of titanium oxide was recorded as Table 2. Table 2 shows experimental results in which the comparison of condensed product and dispersion of titanium oxide are indicated in the cases of the screw configuration (No. 7 screw) using the FK and the screw configuration (No. 8 screw) using the TKD.

TABLE 2

| Screw type | Condensed product of titanium oxide | Dispersion of titanium oxide |
| --- | --- | --- |
| No. 7 | a little | Δ |
| No. 8 | none | ○ |

The No. 8 screw incorporating the TKD in the plasticization kneading portion at the length of 4 times the cylinder inner diameter D can reduce the condensed product of titanium oxide compared with the No. 7 screw incorporating the kneading wing of related art, and the dispersion of titanium oxide can be enhanced.

The present invention has been described in detail in connection with the specific mode of embodiment. It is, however, apparent to those skilled in the art that various modifications or corrections could be made without departing from the scope of the invention.

For example, the length of the twist kneading disks can be freely set as long as being incorporatable in the cylinder. The length of the twist kneading disks may be set equal or less than the length of the cylinder, and preferably, equal or less than 12 times the cylinder inner diameter D in the plasticization kneading portion or the molten kneading dispersion portion of the cylinder.

What is claimed is:

1. A kneading extruder comprising:
a cylinder capable of heating and cooling; and
twin screws provided in the cylinder, the twin screws including in order from an upstream side thereof:
a solid transporting portion;
a plasticization kneading portion comprising;
twist kneading disks; and
cross kneading disks and backward kneading disks, wherein the cross kneading disks and the backward kneading disks are provided downstream from the twist kneading disks; and
a first molten material transporting portion comprising a full flight screw configured to transport material in a downstream direction from a downstream end of the plasticization kneading portion to a discharge port, wherein the discharge port is axially aligned with the full flight screw;
wherein:
the twist kneading disks have a combined length in a longitudinal direction of the cylinder of more than 1.88 times an inner diameter D of the cylinder;
the twist kneading disks comprise a plurality of disks, a length in the longitudinal direction of the cylinder of each disk being 0.1 to 0.5 times the inner diameter D of the cylinder;
each twist kneading disk comprises a helix angle θ between a vertex of one surface side of the disk and a vertex of another surface side of the disk at a tip portion in a range of 0°<θ<90° in a reverse rotating direction of the screws, as viewed from a cross section of the disk having a normal line equivalent to a screw shaft in an end direction of the screw shaft;
a phase angle E in correlation between the twist kneading disks around the screw shaft is in a range of 0°<E<90°; and
a phase angle E between adjacent cross kneading disks is substantially 90°, and
wherein a first vent is provided in the molten material transporting portion between a downstream end of the plasticization kneading portion and the discharge port.

2. The kneading extruder according to claim 1, wherein the cylinder includes in order from the upstream side thereof:
a feed port of material;
the solid transporting portion;
the plasticization kneading portion;
the first molten material transporting portion; and
the discharge port.

3. The plasticization kneading extruder according to claim 1,
wherein the twin screws further include in order from the upstream side thereof:
a molten kneading dispersion portion provided downstream of the first molten material transporting portion; and
a second molten material transporting portion.

4. The kneading extruder according to claim 3,
wherein, the cylinder includes in order from the upstream side thereof:
a feed port of material;
the solid transporting portion;
the plasticization kneading portion;
the first molten material transporting portion;
the molten kneading dispersion portion;
the second molten material transporting portion; and
the discharge port, and
wherein, between the first vent and the discharge port, the cylinder includes in order from the upstream side thereof:
a side feeder; and
a second vent.

5. The kneading extruder according to claim 3,
wherein the molten kneading dispersion portion also comprises twist kneading disks.

6. The kneading extruder according to claim 1, wherein the cross kneading disks are adjacent to the twist kneading disks.

7. The kneading extruder according to claim 1,
wherein the cross kneading disks are configured so as not to transport material, thereby partially blocking the material causing the material to be kneaded.

8. The kneading extruder according to claim 1, wherein the plasticization kneading portion further comprises backward kneading disks in addition to the twist kneading disks;
wherein the backward kneading disks are configured to transport material upstream thereby causing the material to be kneaded.

9. The kneading extruder according to claim 8, wherein the twist kneading disks are configured to transport material downstream.

10. The kneading extruder according to claim 1, wherein the plasticization kneading portion further comprises backward kneading disks in addition to the twist kneading disks and the cross kneading disks;
wherein the cross kneading disks are configured so as not to transport material, thereby partially blocking the material causing the material to be kneaded;
wherein the backward kneading disks are configured to transport material upstream thereby causing the material to be kneaded.

11. The kneading extruder according to claim 10, wherein the twist kneading disks are configured to transport material downstream.

12. The kneading extruder according to claim 1, wherein the cross kneading disks are provided downstream from the twist kneading disks, and
wherein the backward kneading disks are provided downstream from the cross kneading disks.

13. The kneading extruder according to claim 12, wherein the backward kneading disks are adjacent to the cross kneading disks.

14. The kneading extruder according to claim 13, wherein the twist kneading disks are configured to transport material downstream.

15. The kneading extruder according to claim 12, wherein the twist kneading disks are configured to transport material downstream.

16. The kneading extruder according to claim 1, wherein the twist kneading disks have a lenticular shape.

17. The kneading extruder according to claim 1, wherein the twist kneading disks, which are adjacent to each other, are in contact with each other along the longitudinal direction of the cylinder.

* * * * *